United States Patent
Dang et al.

(10) Patent No.: US 7,342,732 B2
(45) Date of Patent: Mar. 11, 2008

(54) OPTICAL MOUNT

(75) Inventors: Lieu-Kim Dang, Gams (CH); Roman Steffen, Rebstein (CH); Mustafa Kücük, Buchs (CH); Christian Haefele, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 11/701,648

(22) Filed: Feb. 1, 2007

(65) Prior Publication Data

US 2007/0195436 A1 Aug. 23, 2007

(30) Foreign Application Priority Data

Feb. 22, 2006 (DE) .................. 10 2006 000 087

(51) Int. Cl.
*G02B 7/02* (2006.01)
(52) U.S. Cl. ............... 359/819; 359/820; 359/822; 359/826; 359/288; 347/244; 347/256; 347/258
(58) Field of Classification Search ............. 359/819, 359/820, 822, 826, 288, 385, 136, 52; 352/231; 126/700; 396/529; 353/100, 101; 347/244, 347/245, 256, 258, 263
See application file for complete search history.

(56) References Cited

U.S. PATENT DOCUMENTS

| | | | | |
|---|---|---|---|---|
| 4,778,252 A | * | 10/1988 | Filho | ............. 359/819 |
| 5,754,350 A | | 5/1998 | Sato | |
| 6,157,501 A | * | 12/2000 | Sato et al. | ............. 359/819 |
| 6,310,735 B1 | | 10/2001 | Best et al. | |
| 6,560,045 B1 | | 5/2003 | Schletterer | |
| 6,819,509 B2 | * | 11/2004 | Wisecarver et al. | ......... 359/819 |
| 2005/0213056 A1 | * | 9/2005 | Ho | ............. 353/100 |
| 2006/0274436 A1 | * | 12/2006 | Inamoto | ............. 359/819 |

FOREIGN PATENT DOCUMENTS

| | | |
|---|---|---|
| DE | 8625896 U1 | 11/1986 |
| DE | 19632267 A1 | 2/1997 |
| DE | 19924849 C1 | 7/2000 |
| DE | 10043344 A1 | 5/2001 |
| GB | 2195469 A | 4/1988 |

* cited by examiner

*Primary Examiner*—Ricky Mack
*Assistant Examiner*—Vipin M Patel
(74) *Attorney, Agent, or Firm*—Abelman, Frayne & Schwab

(57) ABSTRACT

An optical mount (1) for optical component (2) which has a edge contour (4) relative to extending radially optical axis (A), includes a rigid optical support (3) having an axially oriented stop edge (5), which is suitable for an axial contact with the optical component (2), and at least one flexible spring element which is arranged radially outside the stop edge (5), extends axially on the component side and is curved radially inward. The radial spring element passes at an axial distance from the stop edge into a circumferentially closed jacket sleeve an inner contour (8) of which extends farther radially than the edge contour (4) of the optical component (2).

6 Claims, 1 Drawing Sheet

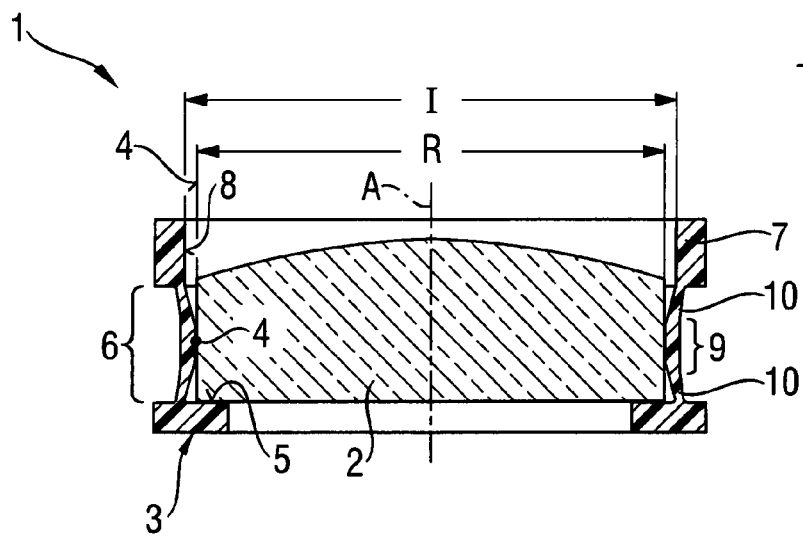
Fig. 1
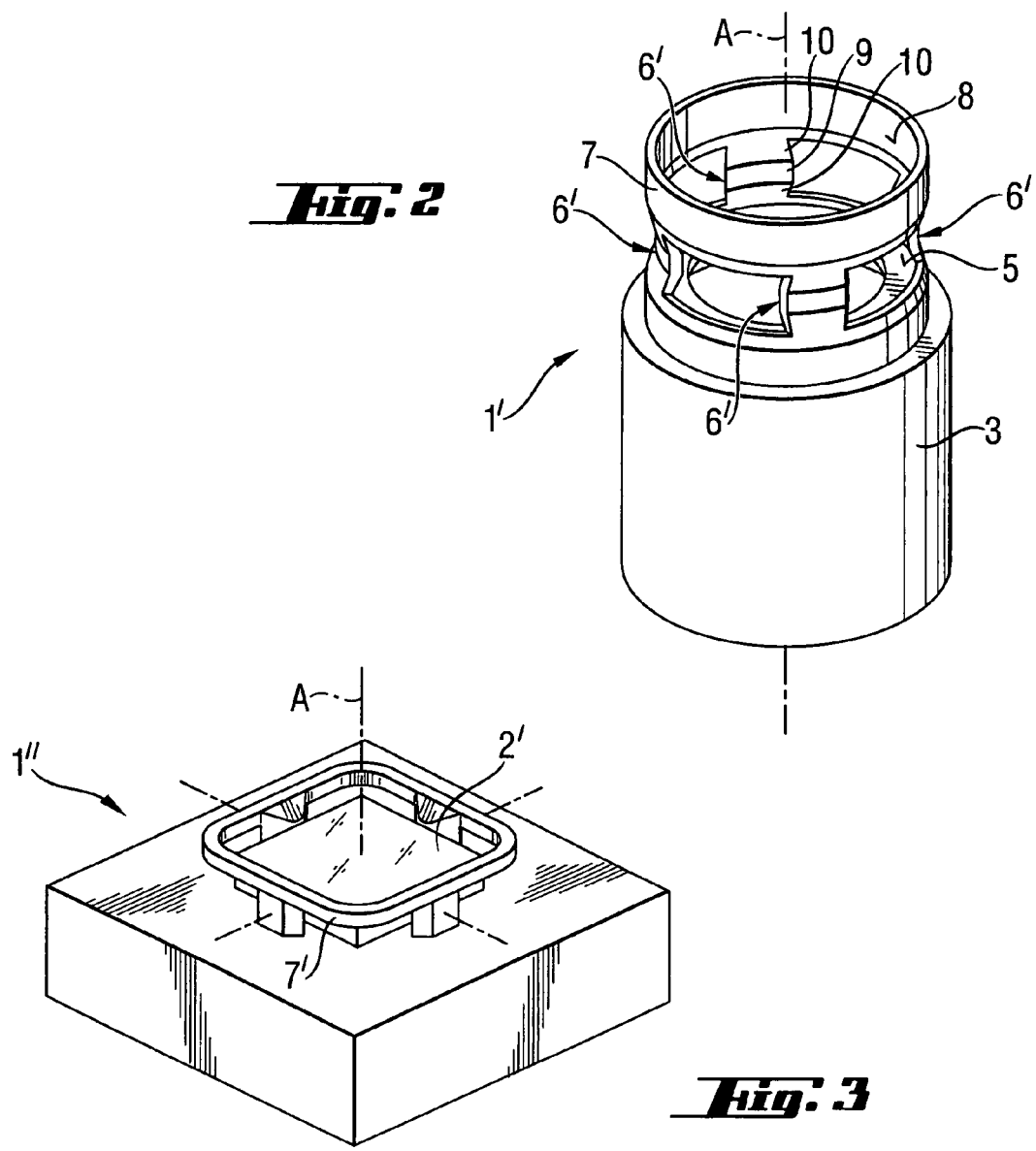
Fig. 2
Fig. 3

OPTICAL MOUNT

BACKGROUND OF THE INVENTION

1. Field of the Invention

The invention relates to an optical mount for optical components such as lenses or beam splitters, particularly, for laser diode collimating optics and a beam splitter of multidirectional laser devices.

2. Description of the Prior Art

Multidirectional laser devices are used for generating precise laser light points or laser light lines, e.g., in the constructional industry, where they are exposed to a temperature range from −20° C. to 60° C. and multiple mechanical vibrations. Thermal and mechanical stability of the mounting of the optical components, namely, the laser diode collimating optics and beam splitters, is essential to the stability of the entire system. Accordingly, for example, there must be a thermal angular drift of less than 0.3"/K and long-term stability.

Usually lenses are glued into appropriate mounts. Because of the thermal expansion coefficients of the glue and its creep properties, this method proves unsuitable for the general framework mentioned above. Solutions for fastening by element of screw-on rings, clamping rings and press fits have likewise proven to be unsuitable because of tension-related deformations.

In an optical mount for optical components according to DE19924849, a flexible ring or annular tubing presses the lens against an inset edge. An annular leaf spring is used in DE 8625896U.

According to DE10043344 and DE19632267, an optical mount for optical components has a circumferentially extending annular groove in the lens in which a plurality of segments, which project freely on one side, engage in a radially springing manner and are arranged at an optical support with an axially oriented stop edge for axial support. Each of the freely projecting segments exerts a radial force on the optical component independently from the other segments. This radial force is conveyed only directly by the optical component so that local deformations of the optical component may occur. In addition, producing annular grooves with the required accuracy is difficult and uneconomical.

SUMMARY OF THE INVENTION

It is the object of the invention to provide a mount for optical components without cement and without deformations.

This and other objects of the present invention, which will become apparent hereinafter, are achieved by providing an optical mount for an optical component with an edge contour arranged radially to the optical axis and including a rigid optical support with an axially oriented stop edge which is suitable for axial contact with the optical component, and at least one flexible radial spring element which is arranged radially outside the stop edge, extends axially on the component side, is curved radially inward, and passes at an axial distance into a circumferentially closed jacket sleeve an inner contour of which extends farther radially than the edge contour.

Because of the circumferentially closed jacket sleeve, the radial forces of the radial spring element are partly absorbed and conveyed between one another within the jacket sleeve via annular forces. Accordingly, local deformations are prevented when the optical component is frictionally mounted. The jacket sleeve which extends farther radially does not deform the optical component even when being mounted. When mounting, the component can contact the stop edge or can be at a short distance therefrom. The required thermal angular drift of less than 0.3"/K and a long-term stability over a temperature range from −20° C. to 60° C. at multiple mechanical vibrations can be achieved as a result of these steps.

The radial spring means advantageously is formed as a circumferentially closed or open spring membrane, whereby the radial force acting on the edge contour is distributed over the circumference continuously at least piecewise, which is particularly suited to lenses.

Alternatively, the radial spring means is advantageously formed of at least two individual, circumferentially distributed spring segments, whereby between the spring segments there are formed free spaces which extend circumferentially at least piecewise and through which, e.g., the partial beams of a beamsplitter, which are reflected perpendicular to the optical axis, can exit.

The spring membrane or spring segment advantageously has an inner, axially straight contact area in the axial center for a frictional radial contact with the optical component. The contact area is limited axially on both sides by thin spring areas so that, with respect to a bending in radial direction, the spring areas have only a slight bending resistance torque which is proportional to the third power of the thickness.

The optical mount is advantageously formed in one piece so that it can be manufactured economically as an injection molded article, e.g., from polyoxymethylene (POM).

The circumferentially closed jacket sleeve is advantageously formed as a closed cylindrical jacket sleeve so that it is optimally shaped for circular components such as lenses. Because of the rotational symmetry, different forces do not occur at the circumference of the lens.

Alternatively, the circumferentially closed jacket sleeve is advantageously formed as a noncircular, e.g., square, closed contour jacket sleeve so that it is optimally shaped for noncircular components such as beamsplitters in the shape of a truncated pyramid. Provided that there is a corresponding integral rotational symmetry, different forces will not occur at the circumference of the lens.

The invention will now be described in detail with reference to an advantageous embodiment of the invention.

BRIEF DESCRIPTION OF THE DRAWINGS

The drawings show:

FIG. 1 a cross-sectional view of an optical mount according to the present invention for an optical component;

FIG. 2 a front perspective view of an optical mount according to the present invention; and FIG. 3 a plan perspective view of an optical mount according to the present invention.

DETAILED DESCRIPTION OF THE PREFERRED EMBODIMENTS

According to FIG. 1, a rotationally symmetric optical mount, which is formed in one piece from polyoxymethylene (POM) for an optical component 2 in the form of a round lens with an edge contour 4 extending radially relative to the optical axis A has a rigid optical support 3 with an axially oriented stop edge 5. The stop edge 5 is suitable for axial support of the optical component 2, and a circumferentially closed flexible spring membrane 6 which is arranged radially outside the stop edge 5, extends axially on the component side and is curved radially inward, and passes at an axial distance into a circumferentially closed cylindrical jacket sleeve 7 an inner cylindrical jacket-shaped inner contour 8 of which having inner diameter I, extends farther radially than the cylindrical jacket-shaped edge contour 4 of diameter R. The spring membrane 6 has an inner, axially straight contact area 9 in the axial center for establishing a frictional radial contact with the optical component 2, which contact area 9 is limited axially on both sides by thin spring areas 10.

According to FIG. 2, an optical mount 1' with an optical axis A analogous to FIG. 1, has a rigid optical support 3 with an axially oriented stop edge 5 and, in contrast to FIG. 1, four individual circumferentially distributed flexible spring segments 6' which are arranged radially outside the stop edge 5, extend axially on the component side, are curved radially inward and, again in a manner analogous to FIG. 1, pass at an axial distance into a circumferentially closed cylindrical jacket sleeve 7 with an inner cylindrical jacket-shaped inner contour 8. The spring segments 6' have an inner, axially straight contact area 9 in the axial center which is limited axially on both sides by thin spring areas 10.

According to FIG. 3, in contrast to FIG. 2, an optical mount 1" with four-fold rotational symmetry for an optical component 2' in the form of a square beamsplitter with an optical axis A has an almost square closed contour jacket sleeve 7'.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. Optical mount for an optical component (2) which
has an edge contour (4) extending radially relative to an optical axis (A), comprising a rigid optical support (3) having an axially oriented stop edge (5), which is suitable for an axial contact with the optical component (2), and at least one flexible spring element which is arranged radially outside the stop edge (5), extends axially on a component side and is curved radially inward, the at least one flexible spring element passing an axial distance from the stop edge (5) into a circumferentially closed jacket sleeve (7) an inner contour (8) of which extends farther radially than the edge contour (4) of the optical component (2);
wherein first and second ends of the at least one flexible spring element are axially spaced, whereby the first end is connected with the stop edge (5) and the second end is connected with the circumferentially closed jacket sleeve; and
wherein the optical mount is formed as a one-piece construction.

2. Optical mount according to claim 1, wherein the radial spring element is formed as a spring membrane (6).

3. Optical mount according to claim 1, wherein the radial spring means comprises at least two individual, circumferentially distributed spring segments (6').

4. Optical mount according to claim 1, wherein the radial spring element has an inner, axially straight contact area (9) in the axial center for establishing a frictional radial contact with the optical component (2), which contact area (9) is limited axially on both sides by thin spring areas (10).

5. Optical mount according to claim 1, wherein the circumferentially closed jacket sleeve (7) is formed as a closed cylindrical jacket sleeve (7).

6. Optical mount according to claim 1, wherein the circumferentially closed jacket sleeve is formed as a non-circular closed contour jacket sleeve (7').

* * * * *